United States Patent [19]

Zeise et al.

[11] Patent Number: 4,799,071
[45] Date of Patent: Jan. 17, 1989

[54] DOT PRINTER WITH AGE COMPENSATION MEANS

[75] Inventors: Eric K. Zeise, Pittsford; Yee S. Ng, Fairport, both of N.Y.

[73] Assignee: Eastman Kodak Company, Rochester, N.Y.

[21] Appl. No.: 99,424

[22] Filed: Sep. 21, 1987

[51] Int. Cl.⁴ .......................................... G01D 15/00
[52] U.S. Cl. ..................................... 346/160; 400/53
[58] Field of Search ........... 346/160, 154, 155, 139 R; 400/53, 119; 364/518–523; 101/DIG. 13; 358/300, 302

[56] References Cited
U.S. PATENT DOCUMENTS 4,536,778  8/1985  Schamphelaere ................... 346/160

FOREIGN PATENT DOCUMENTS 0073983  4/1984  Japan ..................................... 400/53

Primary Examiner—Arthur G. Evans
Attorney, Agent, or Firm—Norman Rushefsky

[57] ABSTRACT

A dot printer apparatus having a recording head with a plurality of recording elements such as LED's, etc. Counting means is provided to count the number of prior activations of each recording element during a past production run. In one embodiment, the recording elements are enabled during a nonproduction run to age those recording elements to compensate for their relative lack of use during the last production run. In another embodiment, age compensation is provided during the next production run with the on-times to the recording elements adjusted in accordance with correction signals related to the counting of prior activations of each of the recording elements during the last production run.

2 Claims, 6 Drawing Sheets

DOT PRINTER WITH AGE COMPENSATION MEANS

BACKGROUND OF THE INVENTION

1. Field of the Invention

The present invention relates to non-impact printing apparatus for printing characters, halftone images and the like with small pixels (dots).

2. Description of the Prior Art

In the prior art as exemplified by U.S. Pat. No. 4,596,995 dot printers employing recording elements such as LED's (light emitting diodes) and the like are known. Briefly, print apparatus of this type comprise a multiplicity of individually addressable point-like radiation sources that are arranged in a row(s) for exposing points upon a photoreceptor during movement thereof relative to and in a direction normal to the row(s). Driver circuits are provided for simultaneously energizing the radiation sources responsive to respective image or data bit input signals applied to the driver circuits during an information line period. In forming images upon the photoreceptor, it is highly desirable that the exposure forming each pixel be uniform. In the case of LED's it is known to provide compensation for inherent differences in luminance between the hundreds or thousands of LED's on a print head by, for example, adjusting the current to each LED or by adjusting the duration of exposure. This compensation is known to be provided during the manufacture of the printer apparatus as well as after manufacture when the printer apparatus is in the customer's possession. This latter becomes necessary because over time, the luminance capability of the LED's change due to differential usage. It is, therefore, highly desirable to provide printer apparatus that can automatically maintain a state of uniformity calibration over time for each recording element, especially for apparatus used for pictorial printing.

SUMMARY OF THE INVENTION

The above and other objects of the invention are realized by a dot printer apparatus comprising:

a recording head having a plurality of recording elements for dot recording on a recording medium during a production run;

driving means for driving each of said recording elements in accordance with respective image data signals for forming an image during the production run; and means for counting a number of prior activations of each recording element and providing correction signals for correction due to nonuniform aging of that recording element.

DESCRIPTION OF THE PREFERRED EMBODIMENTS

The apparatus of the preferred embodiment will be described in accordance with an electrophotographic recording medium. The invention, however, is not limited to apparatus for creating images on such a medium, as other media such as photographic film etc. may also be used with the invention.

Because electrophotographic reproduction apparatus are well known, the present description will be directed in particular to elements forming part of or cooperating more directly with the present invention. Apparatus not specifically shown or described herein are selectable from those known in the prior art.

Figure 1:
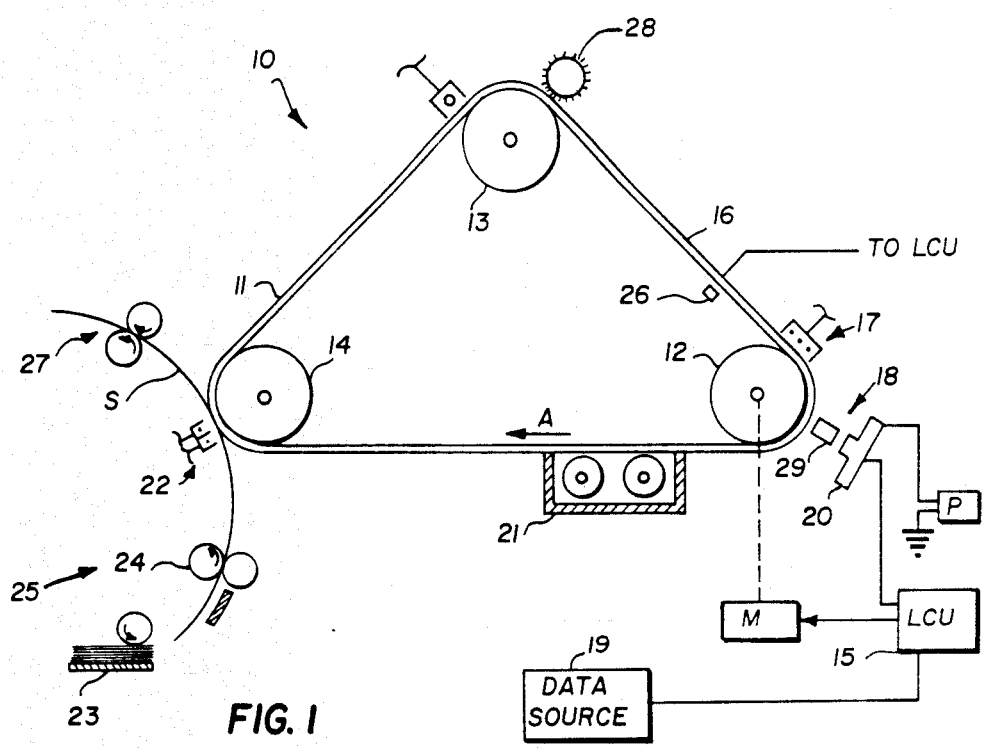
FIG. 1 is a schematic of a print apparatus made in accordance with the invention.

With reference now to FIG. 1, an electrophotographic reproduction apparatus 10 includes a recording medium such as a photoconductive web 11 or other photosensitive medium that is trained about three transport rollers 12, 13 and 14, thereby forming an endless or continuous web. Roller 12 is coupled to a driver motor M in a conventional manner. Motor M is connected to a source of potential when a switch (not shown) is closed by a logic and control unit (LCU) 15. When the switch is closed, the roller 12 is driven by the motor M and moves the web 11 in clockwise direction as indicated by arrow A. This movement causes successive image area of the web 11 to sequentially pass a series of electrophotographic work stations of the reproduction apparatus.

For the purposes of the instant exposure, several work stations are shown along the web's path. These stations will be briefly described.

First, a charging station 17 is provided at which the photoconductive surface 16 of the web 11 is sensitized by applying to such surface a uniform electrostatic primary charge of a predetermined voltage. The output of the charger may be controlled by a grid connected to a programmable power supply (not shown). The supply is in turn controlled by the LCU 15 to adjust the voltage level Vo applied onto the surface 16 by the charger 17.

At an exposure station 18 an electrostatic image is formed by modulating the primary charge on an image area of the surface 16 with selective energization of point-like radiation sources in accordance with signals provided by a data source 19. The point-like radiation sources are supported in a print head 20 to be described in more detail below.

A development station 21 includes developer which may consist of iron carrier particles and electroscopic toner particles with an electrostatic charge opposite to that of the latent electrostatic image. Developer is brushed over the photoconductive surface 16 of the web 11 and toner particles adhere to the latent electrostatic image to form a visible toner particle, transferable image. The development station may be of the magnetic brush type with one or two rollers. Alternatively, the toner particles may have a charge of the same polarity as that of the latent electrostatic image and develop the image in accordance with known reversal development techniques.

The apparatus 10 also includes a transfer station 25 shown with a corona charger 22 at which the toner image on web 11 is transferred to a copy sheet S; and a cleaning station 28, at which the photoconductive surface 16 of the web 11 is cleaned of any residual toner particles remaining after the toner images have been transferred. After the transfer of the unfixed toner images to a copy sheet S, such sheet is transported to a heated pressure roller fuser 27 where the image is fixed to the copy sheet S.

As shown in FIG. 1, a copy sheet S is fed from a supply 23 to driver rollers 24, which then urge the sheet to move forward onto the web 11 in alignment with a toner image at the transfer station 25.

To coordinate operation of the various work stations 17, 18, 21, and 25 with movement of the image areas on the web 11 past these stations, the web has a plurality of indicia such as perforations along one of its edges. These perforations generally are spaced equidistantly along the edge of the web 11. At a fixed location along the path of web movement, there is provided suitable means 26 for sensing web perforations. This sensing produces input signals into the LCU 15 which has a digital computer, preferably a microprocessor. The microprocessor has a stored program responsive to the input signals for sequentially actuating, then deactuating the work stations as well as for controlling the operation of any other machine functions. Additional encoding means may be provided as known in the art for providing more precise timing signals for control of the various functions of the apparatus 10.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 3:
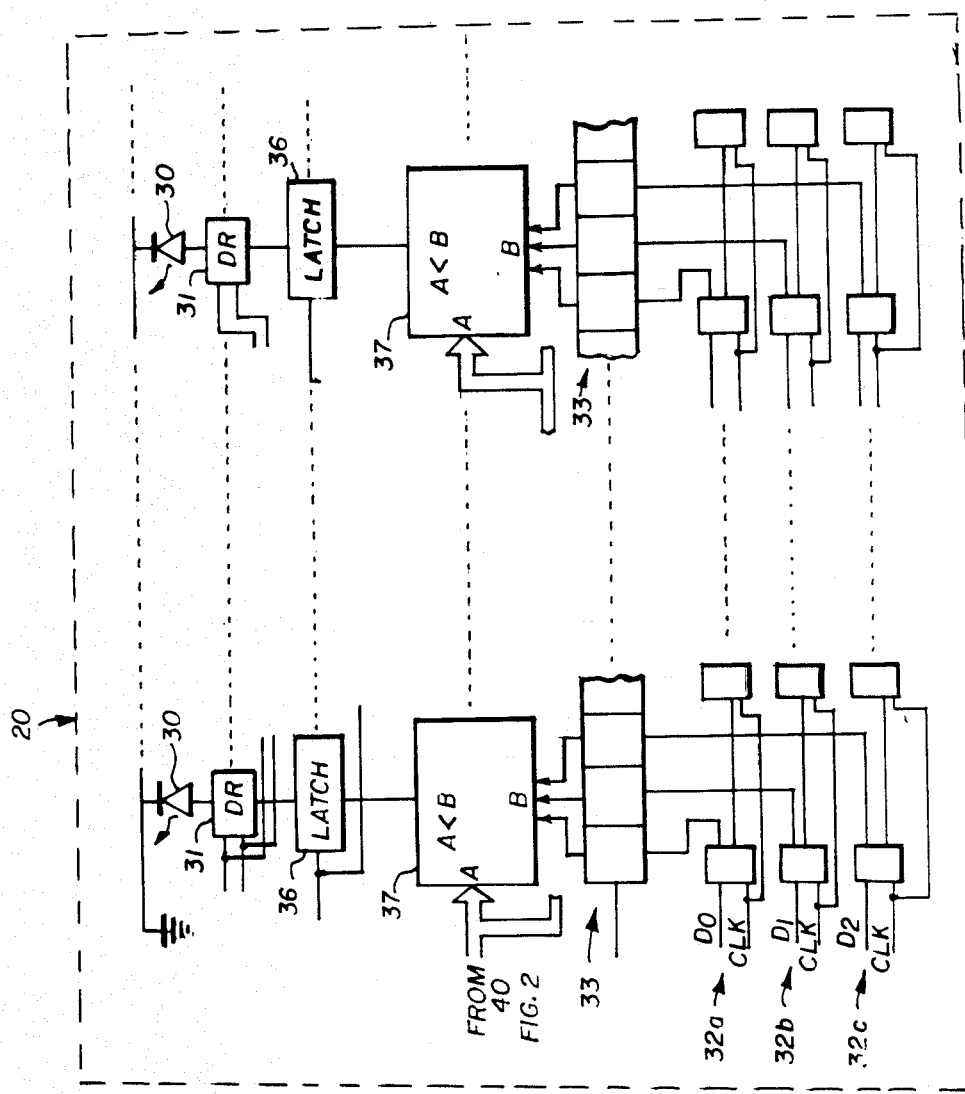
FIG. 3 is a block diagram of a driver circuit for use in a print head of the print apparatus of FIG. 1.

With reference to FIGS. 1 and 3, the print head 20, as noted, is provided with a multiplicity of energizable point-like radiation sources 30, preferably light-emitting diodes (LED's). Optical means 29 may be provided for focusing light from each of the LED's onto the photoconductive surface. The optical means preferably comprises an array of optical fibers such as sold under the name Selfoc, a trademark for a gradient index lens array sold by Nippon Sheet Glass, Limited. Due to the focusing power of the optical means 29, a row of emitters will be imaged on a respective transverse line on the recording medium.

Figure 2:
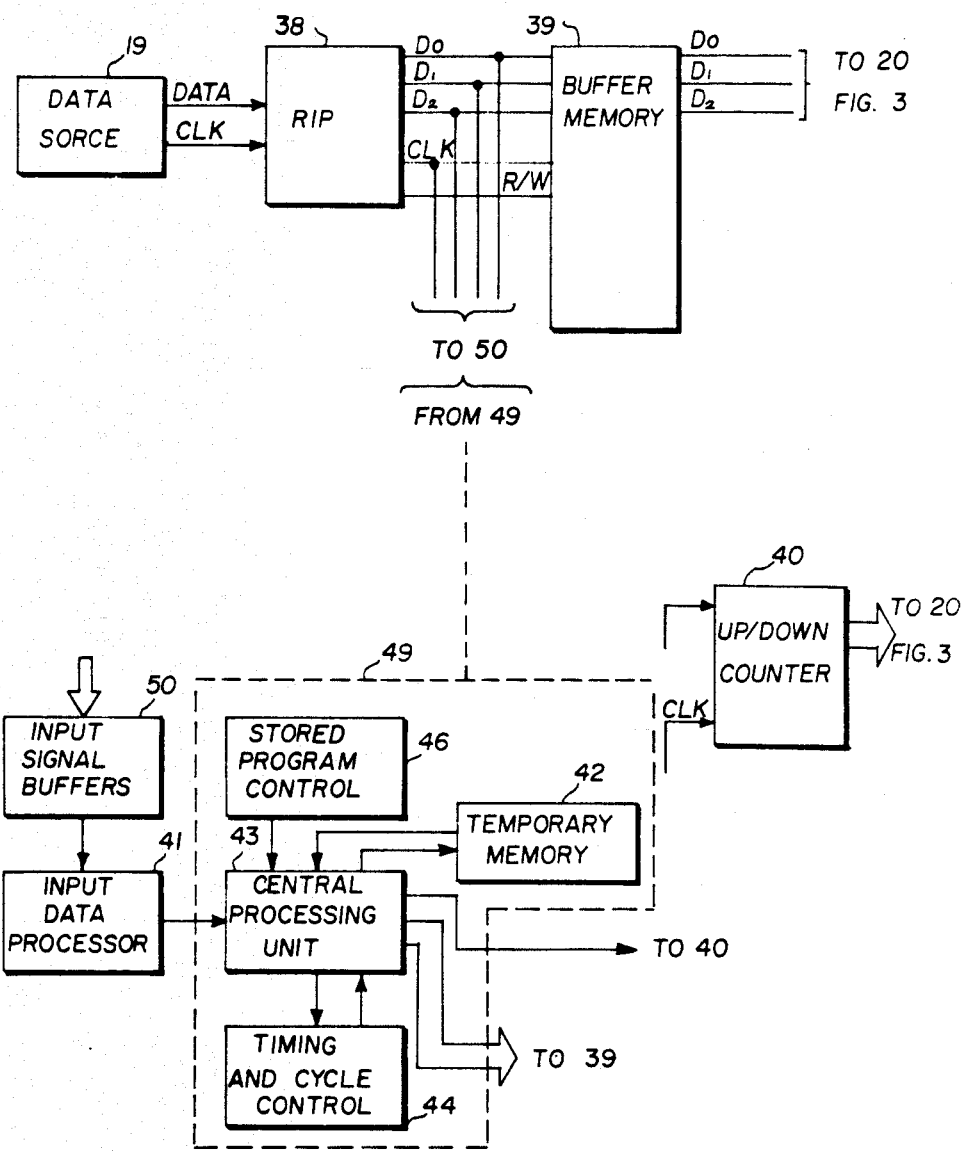
FIG. 2 is a block diagram of circuitry used in forming the print apparatus of FIG. 1.

With reference to FIG. 3, the print head 20 comprises a suitable support with a series of LED chips mounted thereon, each LED chip supporting a plurality of LED's formed thereon. LED chips are arranged end-to-end in a row so that the LED's (only two of which are shown) extend across the width of the web 11 in a single row. Associated with each LED is a driver circuit 31 to provide current from a power source P to the LED for illuminating same for a predetermined time period required for forming a pixel or recording dot on the web 11. The duration of this on time to which an LED is enabled is determined by a data signal. The data signal for each LED comprises a multi-bit signal that is representative of the pixel size or grey scale density to be recorded by the LED on the web 11. The use of three bits of data for each pixel allows for eight pixel size variations (including no size, i.e. no illumination by the LED). For each LED three serial shift registers 32a, 32b and 32c are used to store each of the data bits. Rasterized data in the form of binary logic signal 1's or 0's is serially shifted down each of the shift registers 32a, 32b and 32c under control of clock pulses until all shift registers are full. A latch signal then enables a three-bit latch register 33 associated with each LED to latch the output of the shift registers. The multi-bit output of the latch registers 33 are now compared in a comparator 37 with a descending count from an up/down counter 40 that is under clock control. The counter will count down from decimal eight. When there is a match between the outputs of the counter 40 and the three-bit latch register 33 for that LED, a latch 36 is enabled that causes the current driver 31 to initiate current to the LED 30 from power supply P. A circuit substantially similar to the circuit shown in FIG. 3 is described in U.S. application Ser. No. 000,295, filed on Jan. 2, 1987 in the name of Ayers et al, the contents of which are incorporated by this reference. With reference to FIG. 2, the means for providing data signals to the print head 20 is shown and comprises a data source 19 which may be a computer, word processor, image scanner, etc. This data, along with appropriate clock synchronizing signals, is fed to a conventional raster image processor 38 which processes the incoming digital coded signals into digital rasterized image data signals suitable for forming the appropriate pixel size mandated by the image data signal during a production run or print job.

Figure 4:
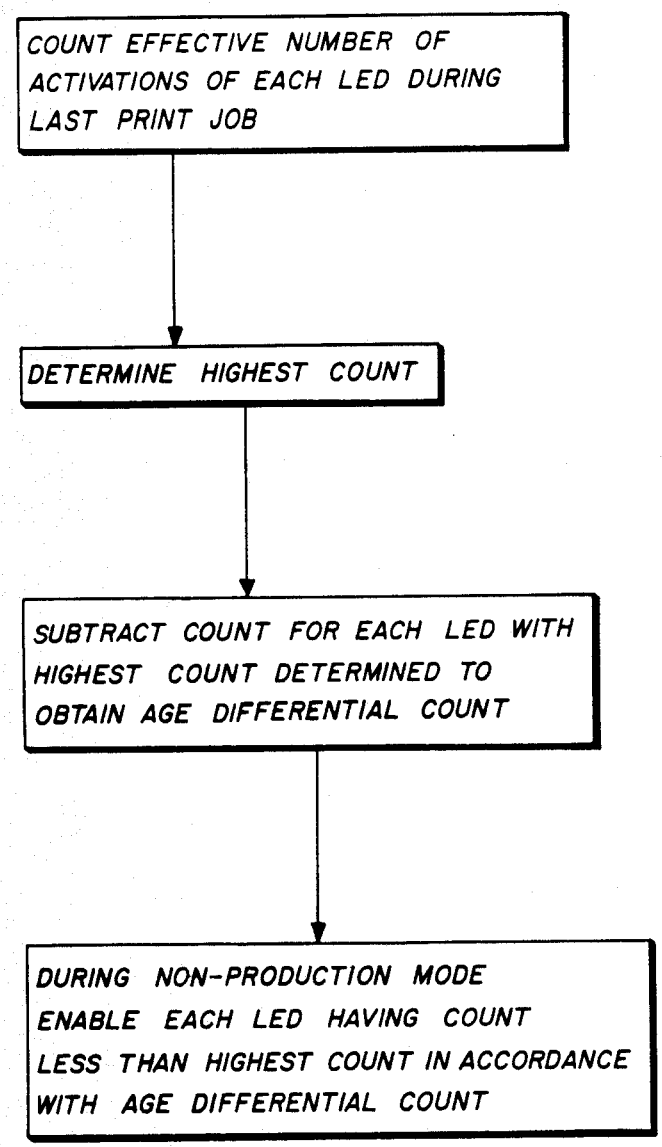
FIGS. 4 and 5 are flowcharts for various programs for operating the circuitry of FIG. 2 in accordance with the invention.

The rasterized image data signals $D_0$, $D_1$, $D_2$ may be buffered in a buffer memory device 39 for storing one or more lines of data signals in the print heads' main scanning direction (i.e., width of web 11). The rasterized image data signals for each LED is also input to a circuit which may comprise a microcomputer 49 or logic circuit that, in addition to providing the necessary timing or clock signals, functions in accordance with a program for which a flowchart is provided in FIG. 4. With reference now also to FIG. 4, the rasterized data is input to microcomputer 49 through input signal buffers 50 and input data processor 41. The microcomputer includes a central processing unit 43, stored program control 46, temporary memory 42 and timing and cycle control unit 44. In accordance with a program in stored program control 46 the microcomputer counts the effective number of activations of each LED during this production run or print job. For example, the print job may comprise printing of several copies of a multipage document. The number of times each LED is activated during this production run or print job is counted. Actually, it is preferred that the count be modified by a factor that takes into account that an LED activated to form a pixel of size or grey scale value decimal seven will age faster than the same LED when activated to form a smaller pixel of size or lower grey scale value decimal one. By experimenting with the type of LED's used, an algorithm can be produced providing age weighting factors to be accorded to the different pixel sizes produced by activation of the LED. Thus, a count is made of the effective number of activations of each LED for the last print job. Of course, if a so-called binary print head is used wherein data for each LED for each line to be recorded in the main scanning direction is either a digital 1 or 0, then no age weighting factors may need to be provided based on pixel size and thus the effective number of activations of each LED during the last job is the actual number.

In either event, the effective number of activations of each LED occurring during the past production run or print job is determined. The count for each LED is compared with the highest count noted for all the LED's. For those LED's having counts less than the highest count, the count for each LED is subtracted from the number representing the highest count to obtain an age differential count. Before the start of the next production run or print job, the respective LED's accorded to have age differential counts are illuminated during a non-print mode to effectively age these LED's to that of the LED(s) having the oldest effective age based on use. In the example of the binary type print head referred to above, each LED will be activated for the number of times commensurate with the age differential count. For the grey scale type of print head, an algorithm may be provided based on experimentation for the particular LED used to provide equivalent aging based on the age differential count determined. Simulated data signals representing the age differential count may then be output by microcomputer 49 to buffer memory device 39 and then to the print head. The simulated data signals then enable the LED's during a non-production run or non-print job mode in accordance with the description provided above for operation of the print head.

In the above discussion, assumption was made that the LED's are generally similar in characteristics and age uniformly based on equivalent use. Such might be the case where care is taken in fabricating the print head to select LED's of fairly similar characteristics. Where the light output characteristics of the LED's on a print head are not similar, aging of the LED's will not be the same even if the LED's are provided with equivalent use. For example, a weak light emitting LED may tend to age faster than a relatively more efficient light emitting LED. While uniformity on the print head can be adjusted at least initially by providing the weaker LED's with more current, it is desirable to automatically make adjustment because over time due to faster aging of the basically weaker light emitting LED's, nonuniformities in light output will again result.

Figure 5:
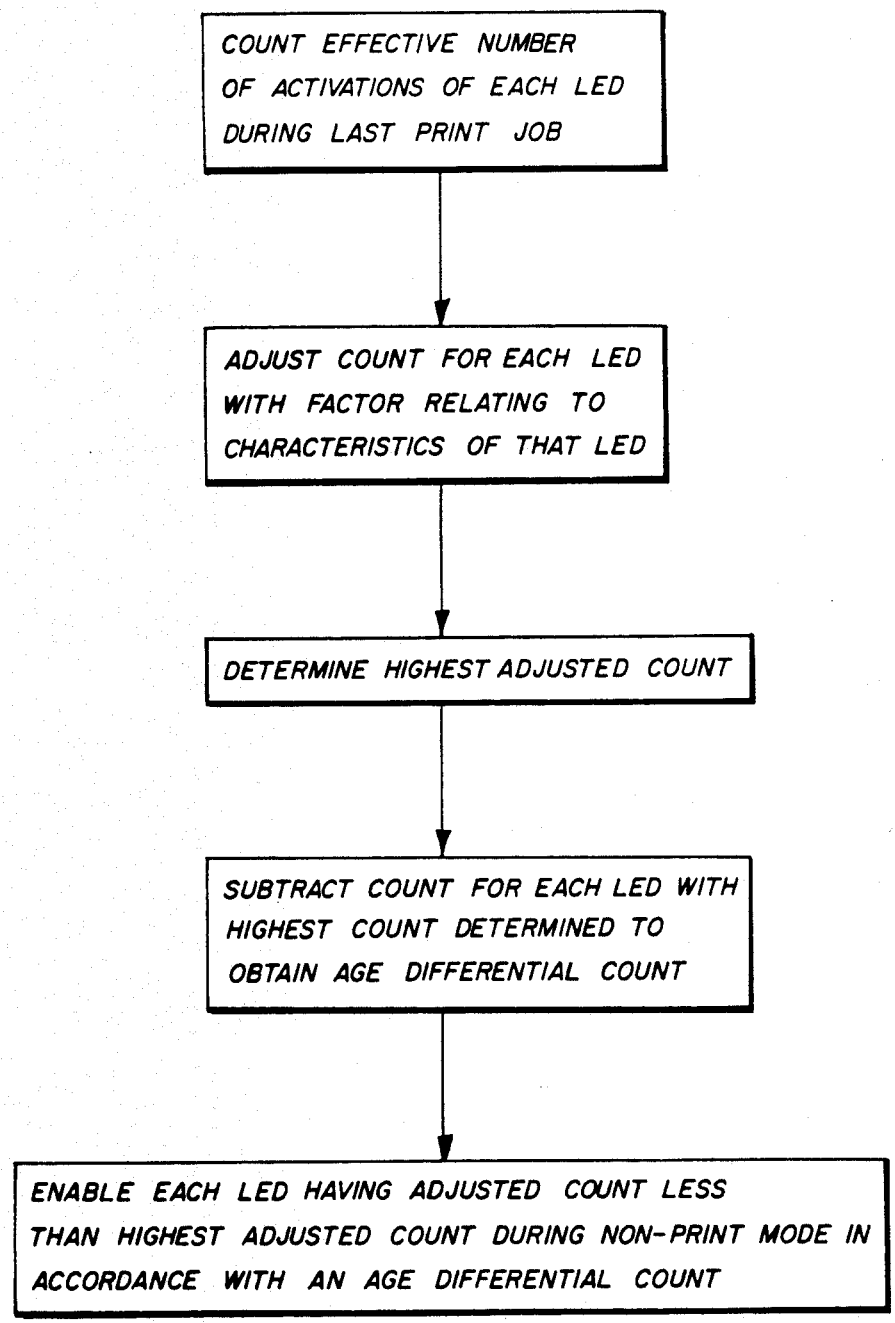

With reference now to the flowchart of FIG. 5, a program is stored in stored program control 46 which causes the microcomputer to count the effective number of activations of each LED during the last print job. As before, the effective count can either be a straight count, particularly for a binary print head, or a weighted count, weighted to give greater credit to activations for pixels of greater size or higher grey scale value. The program then causes the microcomputer to adjust the count with a factor relating to light emitting characteristics of that LED. This factor may also be adjusted based on the updated age of the LED. The highest adjusted count is then determined. The adjusted counts for each of the LED's is then compared with the highest count and subtracted or otherwise mathematically manipulated to provide an age differential count. Before the start of the next print job, the respective LED's accorded to have age differential counts are illuminated during a non-production run or non-print job mode to effectively age the LED's to that of the LED(s) having the oldest effective age based on use in accordance with the procedure and means described above.

Figure 7:
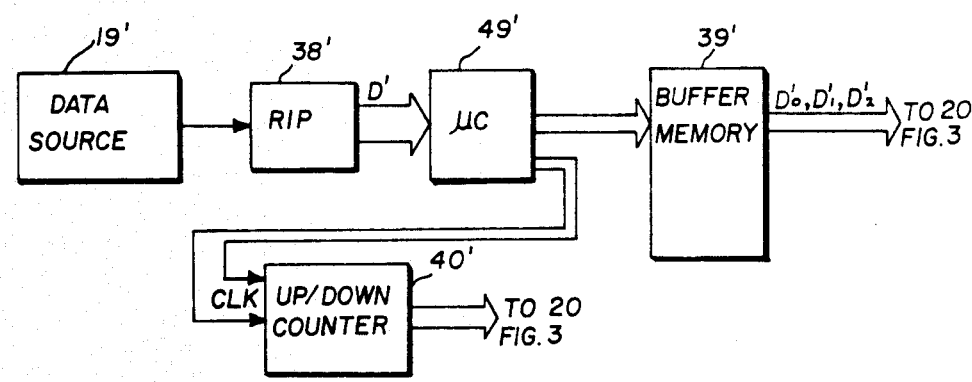
FIG. 7 is a block diagram of circuitry used in forming another embodiment of printer apparatus.
Figure 6:
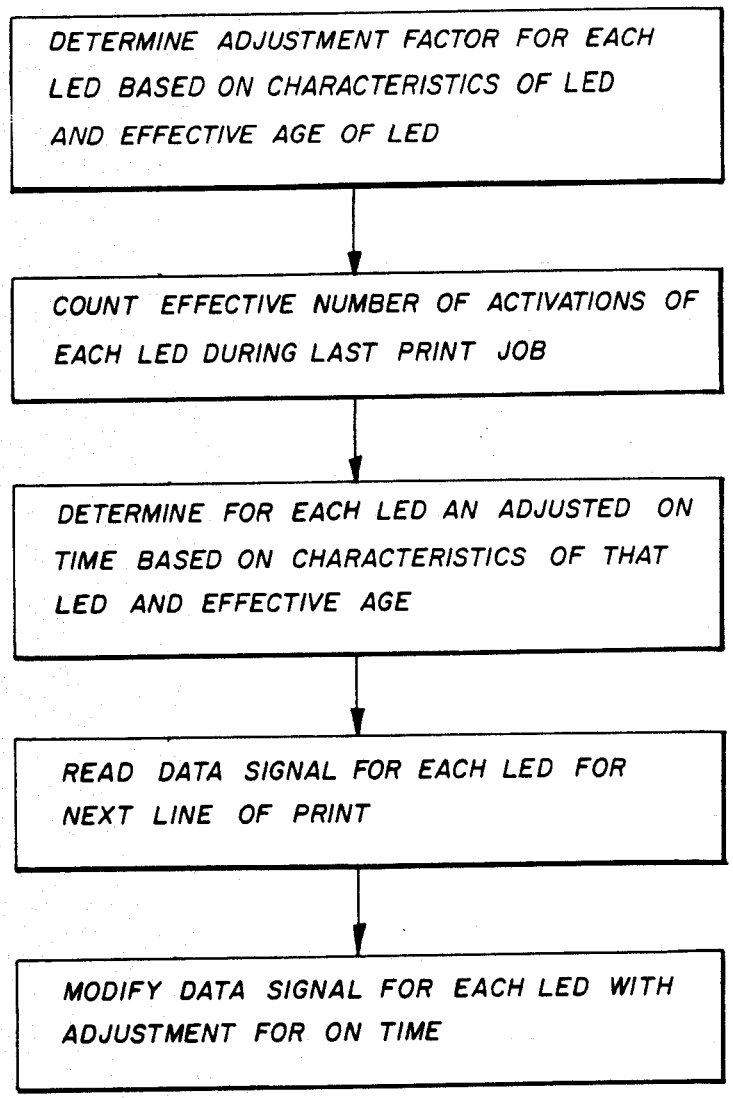
FIG. 6 is a flowchart for a program for operating the circuitry of the embodiment shown in FIG. 7.

Reference will now be made to the flowchart of FIG. 6 and the embodiment shown in FIG. 7. In the embodiment which will now be described, correction of data, for age compensation, is made to adjust LED output during a print job. In the circuit of FIG. 7, a data source 19' as described above provides coded data to a conventional raster image processor 38'. The rasterized data D' is then output to a microcomputer 49' that is programmed in accordance with an algorithm that is described in the flowchart of FIG. 6. The data associated for each LED is examined and an adjustment factor for each LED based on characteristics of that LED and its effective age. In the simple case assume that the printing of data is to be of the binary type of printing; i.e., an LED is either on or off. The same print head 20 as shown in FIG. 3 may be used with the circuit of FIG. 7. The multiple bits of information for each LED may be used to determine on time of an LED only for light emission compensation to provide uniform pixel sizes. In stored program control memory of the microcomputer there are provided algorithms for calculating an adjustment or correction factor for an LED based on its history and number of prior activations. This algorithm will also take into account that weak light emitters tend to age faster than strong light emitters. Such an algorithm will be based on experimental observed behavior for the types of LED's used. The data for each LED is modified by the adjustment factor. In addition, a count is made of the number of activations of each LED during the last print job. The last production run or print job may be either one or more image frames of data or even just what occurred in printing the prior line of pixels or dots. After counting the number of activations of the LED during the last production run or print job, the adjustment factor for that LED is changed in accordance with this new information upon printing the next line or job of data. In the example of a binary printer, data from the raster image processor associated with each LED will be either a logic 1 or 0, depending upon whether an LED is to be illuminated or not illuminated. This data is then provided to the microcomputer 49' which adjusts the data to an on time that is appropriate for that LED based on its particular use history. This on time is provided as a multi-bit digital signal to buffer memory device 39'. The multi-bit signal is then "treated" by the print head as a grey scale data input in accordance with the decription provided above for the print head of FIG. 3.

Where the data source provides grey scale data and the printer is to be operated as a true grey scale printer, a multi-bit data signal from the raster image processor to the microcomputer 49' has the data for each LED modified in accordance with the age of that LED based on a relationship involving the number of activations as modified by the type of activation. For example, activations where an LED is enabled to be on for a long duration to form a large pixel are weighted more than activations where the LED is on for only its minimum period. It is possible that no count will be made for these minimum activation periods as it may be found that they do not affect aging of the LED's. Thus, an effective age history of each LED is made and an effective count of the number of activations during the last print job is also made. A correction factor is determined and the corrected data sent to buffer memory for printing by the print head of FIG. 3.

While correction of printing time has been described for each LED based on the age history of that LED, other modifications are possible including adjustment for factors such as print head temperature, etc.

The invention is also applicable to other types of printers with recording elements such as thermal printers, ink jet, electrographic printers, etc.

The invention has been described in detail with particular reference to preferred embodiments thereof. However, it will be understood that variations and modifications may be effected within the spirit and scope of the invention.

We claim:

1. A dot printer apparatus comprising:

a recording head having a plurality of recording elements for dot-recording on a recording medium during a production run;

driving means for driving each of said recording elements in accordance with respective image data signals for forming an image during the production run;

means for counting a number of prior activations of each recording element and providing correction signals for correction due to nonuniform aging of that recording element; and means responsive to said correction signals for activating said recording elements during a non-production run.

2. The apparatus of claim 1 and wherein the recording elements are light emitting diodes.

* * * * *